United States Patent
Giles

(10) Patent No.: US 10,123,507 B2
(45) Date of Patent: Nov. 13, 2018

(54) ANIMAL FEEDER

(71) Applicant: Jeffery F. Giles, Okeechobee, FL (US)

(72) Inventor: Jeffery F. Giles, Okeechobee, FL (US)

(*) Notice: Subject to any disclaimer, the term of this patent is extended or adjusted under 35 U.S.C. 154(b) by 323 days.

(21) Appl. No.: 14/825,617

(22) Filed: Aug. 13, 2015

(65) Prior Publication Data
US 2016/0044894 A1 Feb. 18, 2016

Related U.S. Application Data

(60) Provisional application No. 62/070,040, filed on Aug. 13, 2014.

(51) Int. Cl.
*A01K 5/01* (2006.01)
*A01K 5/02* (2006.01)

(52) U.S. Cl.
CPC .............. *A01K 5/0225* (2013.01); *A01K 5/01* (2013.01)

(58) Field of Classification Search
CPC ........ A01K 5/01; A01K 5/0225; A01K 39/01; A01K 39/012; A01K 39/014
USPC ........................ 119/52.1, 52.2, 52.4, 53, 53.5
See application file for complete search history.

(56) References Cited

U.S. PATENT DOCUMENTS

| | | | |
|---|---|---|---|
| 453,817 A | 6/1891 | Mills | |
| 1,528,413 A * | 3/1925 | Frest | A01K 39/012 119/52.4 |
| 2,524,502 A * | 10/1950 | Wilkinson | A01K 39/012 119/57.9 |
| 2,544,578 A | 3/1951 | Winkler | |
| 2,666,415 A * | 1/1954 | Scruggs | A01K 39/0113 119/52.4 |
| 3,249,090 A | 5/1966 | Ripley | |
| 3,645,235 A * | 2/1972 | Suchla | A01K 39/012 119/52.2 |
| 4,180,014 A | 12/1979 | Mathews | |
| 4,352,339 A * | 10/1982 | Lewis | A01K 1/0356 119/475 |
| 4,694,780 A | 9/1987 | Keuter et al. | |
| 4,825,811 A | 5/1989 | O'Kelley | |
| 5,078,098 A * | 1/1992 | Ragen | A01K 39/012 119/52.2 |
| 5,255,632 A | 10/1993 | Thomas et al. | |
| 5,272,998 A | 12/1993 | Pannier et al. | |
| 5,465,683 A * | 11/1995 | Reisdorf | A01K 39/014 119/52.2 |
| 5,794,561 A | 8/1998 | Schulz | |

(Continued)

*Primary Examiner* — David J Parsley
(74) *Attorney, Agent, or Firm* — Akerman LLP; Michael K. Dixon

(57) ABSTRACT

An animal feeder configured to provide feed to animals via gravity actuation is disclosed. The animal feeder may be configured such that feed is contained within a feed container and provided to animals via gravity and through an outlet opening configured to eliminate stagnant pockets and feed spoilage. The animal feeder is also configured to feed only specific animals. In particular, the animal feeder may include a support system with a pivot for supporting the feed container above ground level and enabling the feed container to rotate relative to the pivot, thereby preventing smaller species animals from feeding in the feed trough in favor of larger species animals. If a smaller species animal attempts to jump and place its front legs on the feeder to feed from the feed trough, the feeder spins causing the smaller species animal to fall back to the ground.

18 Claims, 6 Drawing Sheets

(56) References Cited

U.S. PATENT DOCUMENTS

| | | | | |
|---|---|---|---|---|
| 5,924,381 A | * | 7/1999 | Bloedorn | A01K 39/012 |
| | | | | 119/429 |
| 6,397,779 B1 | * | 6/2002 | Bonne | A01K 39/012 |
| | | | | 119/429 |
| 6,986,322 B2 | * | 1/2006 | Lumpkin | A01K 39/0113 |
| | | | | 119/52.3 |
| 7,735,454 B1 | * | 6/2010 | Stoppelberg | A01K 5/0225 |
| | | | | 119/52.4 |
| 8,104,430 B1 | * | 1/2012 | Powell, Jr. | A01K 39/0113 |
| | | | | 119/52.3 |
| 8,418,651 B1 | | 4/2013 | Kight | |
| 8,857,374 B1 | * | 10/2014 | Donegan | A01K 39/012 |
| | | | | 119/52.2 |
| 2007/0137585 A1 | | 6/2007 | Rausch et al. | |

\* cited by examiner

ANIMAL FEEDER

CROSS-REFERENCE TO RELATED APPLICATION

This application claims the benefit of U.S. Provisional Patent Application No. 62/070,040, filed Aug. 13, 2014, the entirety of which is incorporated herein.

FIELD OF THE INVENTION

The present invention is directed generally to animal feeders, and more particularly to self-cleaning feeders particularly suited for feeding animals, such as, but not limited to, deer and elk.

BACKGROUND OF THE INVENTION

Animal feeders are often used to provide supplemental feed to wildlife and to attract wildlife to a particular location for viewing or hunting. The feeders come in many shapes and sizes. Many feeders include battery driven motors that are controlled by timers to distribute feed at dawn and dusk in an effort to condition wildlife to visit the feeder at those times. Often, these systems malfunction due to a host of issues, including, but not limited to, battery failure, timer failure, motor failure and operator error. Often wildlife feeders contain one to two months of feed. Thus, the feeders are not often checked more often than about once every one to two months. If a feeder has malfunctioned and is not checked soon relative to the first malfunction, the wildlife will often stop visiting the feeder, thereby defeating the purpose of the feeder. In addition, the feed contained within the feeder will spoil if left in the feeder too long. Spoiled feed can contaminate all feed within the feeder necessitating the feed be disposed of from the feed container and the feed container be cleaned.

In addition, many feeders are configured such that dead spots are present within the feeders where feed accumulates without being able to flow through an exhaust outlet. The feed that accumulates within the dead spots will eventually spoil unless removed first. Many configurations of feeders require that all of the feed be removed first from the feeder to be able to access the spoiled food. Removing all of the feed is very time consuming. Thus, a need exists for a more efficient wildlife feeder system that overcomes the deficiencies of conventional feeder systems.

SUMMARY OF THE INVENTION

An animal feeder configured to provide feed to animals via gravity actuation is disclosed. The animal feeder may be configured such that feed is contained within a feed container and provided to animals via gravity and through an outlet opening configured to eliminate stagnant pockets and feed spoilage. The animal feeder is also configured to feed only specific animals. In particular, the animal feeder may include a support system with a pivot for supporting the feed container above ground level and enabling the feed container to rotate relative to the pivot, thereby preventing smaller species animals from feeding in the feed trough in favor of larger species animals. If a smaller species animal attempts to jump and place its front legs on the feeder to feed from the feed trough, the feeder spins causing the smaller species animal to fall back to the ground. In at least one embodiment, the animal feeder is configured to feed larger species animals, such as, but not limited to, whitetail deer, red deer and elk while preventing smaller species animals such as, but not limited to, raccoons, opossums, squirrels and wild hogs from stealing expensive feed grains from the animal feeder.

In at least one embodiment, the animal feeder may include a feed container formed from first and second sidewalls positioned nonparallel and nonorthogonal relative to each other to contain feed. The first and second sidewalls may create at least a portion of a first outlet opening positioned beneath a first inlet opening. A removable lid may be removably coupled to the feed container that is configured to prevent rain from entering the feed container. A feed trough may be positioned at the first outlet opening and may be configured to capture feed from the feed container without having the feed free flow from the feed container without external agitation of the feed. The animal feeder may include a support system including one or more pivots for supporting the feed container above ground level and enabling the feed container to rotate relative to one or more supports, thereby preventing smaller species animals from feeding in the feed trough in favor of larger species animals.

The first outlet opening may extend from a first end of the feed container to a second end of the feed container preventing feed from becoming trapped within the feed container and spoiling. The first outlet opening may extend from a first endwall forming a portion of feed container to a second endwall forming a portion of the feed container. The first sidewall may include a first downward edge that contacts an upper edge of a rear wall of the feed trough at a level that is higher than a downward edge of the second sidewall, thus causing the second sidewall to extend lower than the first sidewall yet positioning the downward edge of the second sidewall above an upper surface of the feed trough. In at least one embodiment, the feed trough may be formed from a C channel. A first endwall may extend between the first and second sidewalls at a first end and a second endwall may extend between the first and second sidewalls at a second end on an opposite side from the first end. A first end support may attach the first endwall to the feed trough, and a second end support may attach the second endwall to the feed trough. In at least one embodiment, the first and second end supports may be C channels.

The animal feeder may include one or more vents for enabling air and moisture to be exhausted from the feed container. The vent may be positioned in a first endwall forming a portion of the feed container extending between the first and second sidewalls of the feed container. The animal feeder may include one or more varmint shields extending from the trough to prevent small animal species, such as, but not limited to, varmints, from feeding on feed within the feed trough. The animal feeder may include one or more drain holes positioned in the feed trough for draining liquids from the feed trough.

The support system of the animal feeder may include one or more receivers extending downwardly from the feed trough. The receiver may be configured to be rotatably attached to an upper end of a post. The post may extend into the receiver.

The removable lid of the animal feeder may be formed from first and second sloped surfaces that are individually sloped and coupled to each other. The removable lid may be coupled to the feed container with removable connectors. The removable connectors may include, but are not limited to, screws, bolts, nuts and wing nuts. In at least one embodiment, a bolt may be attached to a first bracket welded to the first side and a wing nut may be used to releasably secure the removable lid to the first bracket. Similarly, a bolt may be attached to a second bracket welded to the second side and a wing nut may be used to releasably secure the removable lid to the first bracket.

An advantage of the animal feeder is that the animal feeder is configured to feed larger species animals, such as, but not limited to, whitetail deer, red deer and elk while preventing smaller species animals such as, but not limited to, raccoons, opossums, squirrels and wild hogs from stealing expensive feed grains from the animal feeder. In at least one embodiment, the animal feeder may include a support system including one or more pivots for supporting the feed container above ground level and enabling the feed container to rotate relative to the pivot, thereby preventing smaller species animals from feeding in the feed trough in favor of larger species animals. When smaller species animals try to feed by placing their front legs on the feed trough, the animal feeder spins causing the smaller species animals to fall off of the feed trough.

Another advantage of the animal feeder is that the animal feeder is configured to supply feed to the feed trough via gravity and does not rely on any power source, including battery power sources, thus greatly reducing the likelihood of failure.

Yet another advantage of the animal feeder is that the animal feeder includes a first outlet opening extending from a first end of the feed container to a second end of the feed container preventing feed from becoming trapped within the feed container and spoiling.

Another advantage of the animal feeder is that the animal feeder includes one or more vents providing ventilation to the feed container for preventing mildew growth within the feed container and feed spoilage.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
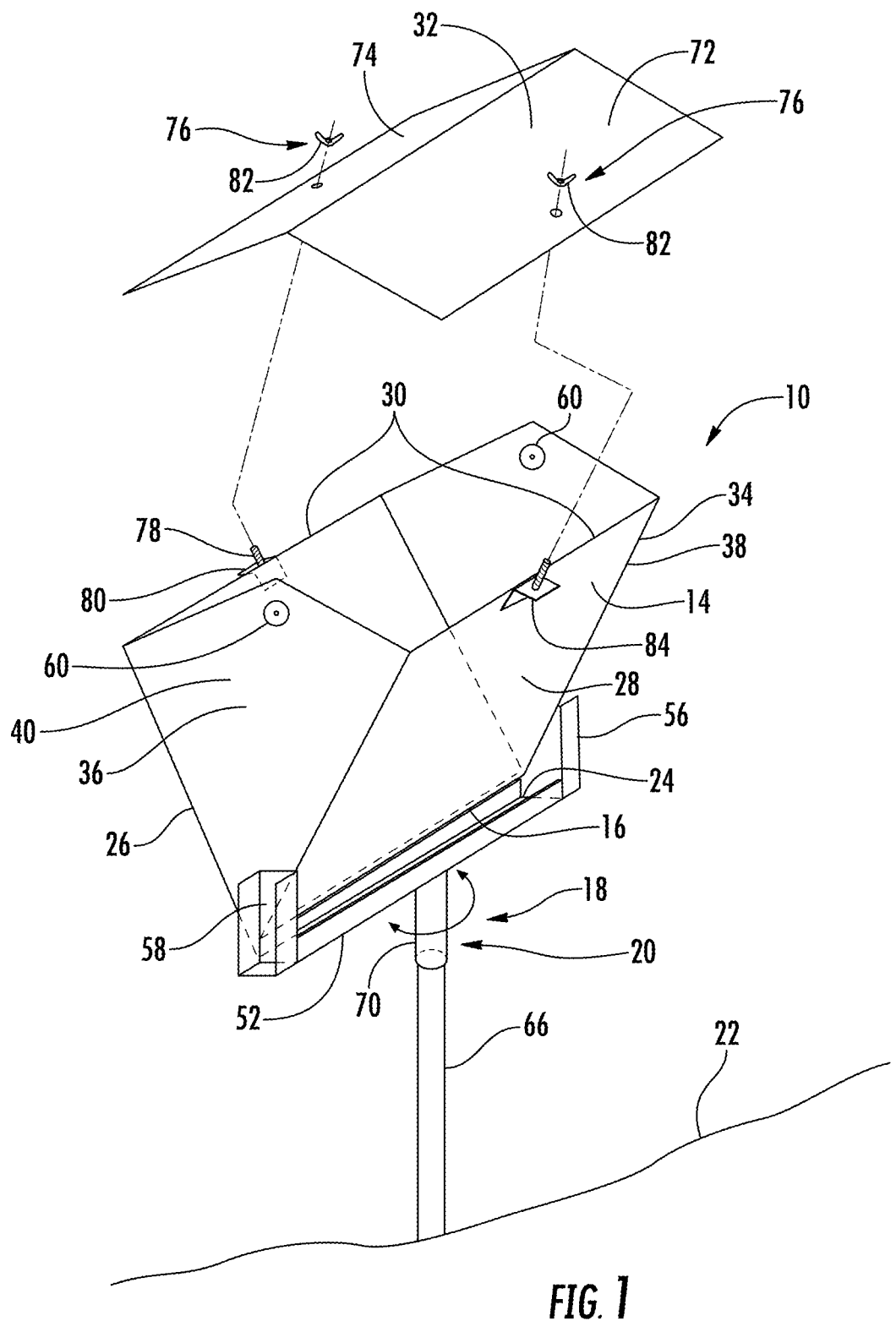
FIG. 1 is an exploded perspective view an animal feeder.
Figure 2:
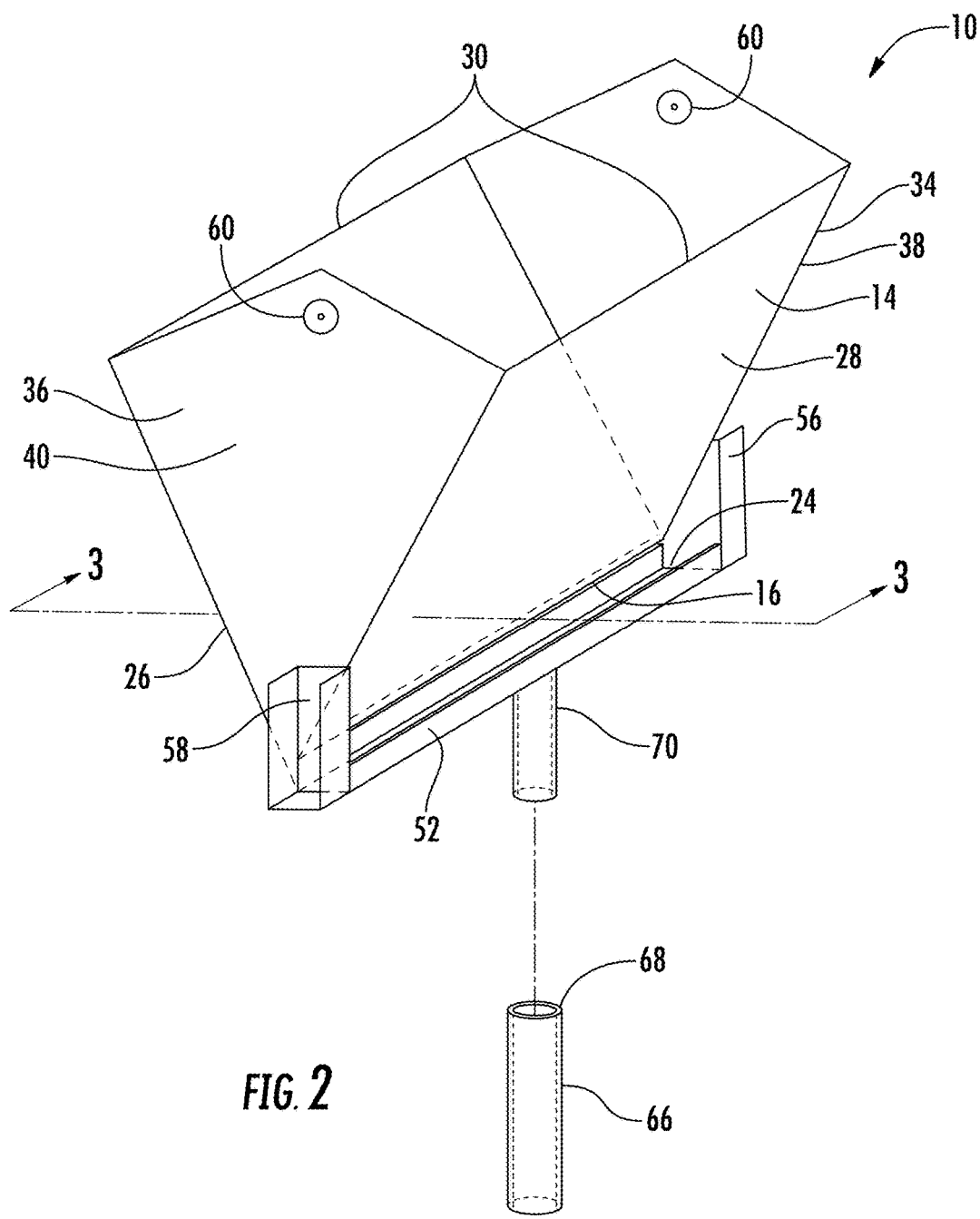
FIG. 2 is an exploded perspective view an animal feeder of FIG. 1 without the removable lid.

As shown in FIGS. 1-8, an animal feeder 10 configured to provide feed 12 to animals via gravity actuation is disclosed. The animal feeder 10 may be configured such that feed 12 is contained within a feed container 14 and provided to animals via gravity and through an outlet opening 16 configured to eliminate stagnant pockets and feed spoilage. The animal feeder 10 is also configured to feed only specific animals. In particular, the animal feeder 10 may include a support system 18 with a pivot 20 for supporting the feed container 14 above ground level 22 and enabling the feed container 14 to rotate relative to the pivot 20, thereby preventing smaller species animals from feeding in the feed trough 24 in favor of larger species animals. If a smaller species animal attempts to jump and place its front legs on the animal feeder 10 to feed from the feed trough 24, the animal feeder 10 spins causing the smaller species animal to fall back to the ground. In at least one embodiment, the animal feeder 10 is configured to feed larger species animals, such as, but not limited to, whitetail deer, red deer and elk while preventing smaller species animals such as, but not limited to, raccoons, opossums, squirrels and wild hogs from stealing expensive feed grains from the animal feeder 10. The animal feeder 10 may be formed from materials capable of supporting hundreds of pounds, and in some embodiments, a thousand pounds of feed. As such, the animal feeder 10 may be formed from metals, such as, but not limited to, galvanized steel, stainless steel, aluminum and iron.

In at least one embodiment, the animal feeder 10 may be formed from a feed container 14 formed from first and second sidewalls 26, 28 positioned nonparallel and nonorthogonal relative to each other to contain feed 12. The first and second sidewalls 26, 28 may create at least a portion of a first outlet opening 16 positioned beneath a first inlet opening 30. The animal feeder 10 may also include a removable lid 32 removably coupled to the feed container 14. The removable lid 32 may be configured to prevent rain from entering the feed container 14. The animal feeder 10 may also include one or more feed troughs 24 positioned at the first outlet opening 16 and configured to capture feed 12 from the feed container 14 without having the feed 12 free flow from the feed container 14 without external agitation of the feed 12, such as by an animal nose or tongue or a human hand. The animal feeder 10 may include a support system 18 including one or more pivots 20 for supporting the feed container 14 above ground level 22 and enabling the feed container 14 to rotate relative to the pivot 20, thereby preventing smaller species animals from feeding in the feed trough 24 in favor of larger species animals. By preventing smaller species animals from feeding in the feed trough 24 in favor of larger species animals, a significant savings of feed is realized because the smaller species animals are unable to steal the feed 12. The feed trough 24 may include one or more drain holes 64 positioned in any appropriate manner to allow fluids, such as, but not limited to, water to drain from the feed trough 24.

As shown in FIGS. 1, 2, 4 and 7, the first outlet opening 16 may extend from a first end 34 of the feed container 14 to a second end 36 of the feed container 14 preventing feed 12 from becoming trapped within the feed container 14 and spoiling. The first outlet opening 16 may extend from a first endwall 38 forming a portion of feed container 14 to a second endwall 40 forming a portion of the feed container 14. By extending from the first endwall 38 to the second endwall 40, which is an entire width of the feed container 14, the first outlet opening 16 is configured to prevent stagnant pockets of feed from forming within the feed container 14. The first outlet opening 16 is also configured to allow water found within the feed container 14 to freely drain out, no matter whether water is from rain that leaked into the feed container 14 through the vents 60 or via condensation. As such, the first outlet opening 16 extending an entire width of the feed container 14 reduces the risk of feed spoilage.

In at least one embodiment, the feed container 14 may include a first endwall 38 extending between the first and second sidewalls 26, 28 at a first end 34 and a second endwall 40 extending between the first and second sidewalls 26, 28 at a second end 36 on an opposite side from the first end 34. A first end support 56 may attach the first endwall 38 to the feed trough 24 and a second end support 58 may attach the second endwall 40 to the feed trough 24. In at least one embodiment, the first and second end supports 56, 58 may be formed from C channels. The first and second end supports 56, 58 may be welded to the first and second sidewalls 26, 28 and the feed trough 24. The first and second sidewalls 26, 28 may have any appropriate shape, and, in at least one embodiment, may have a generally diamond shape.

Figure 3:
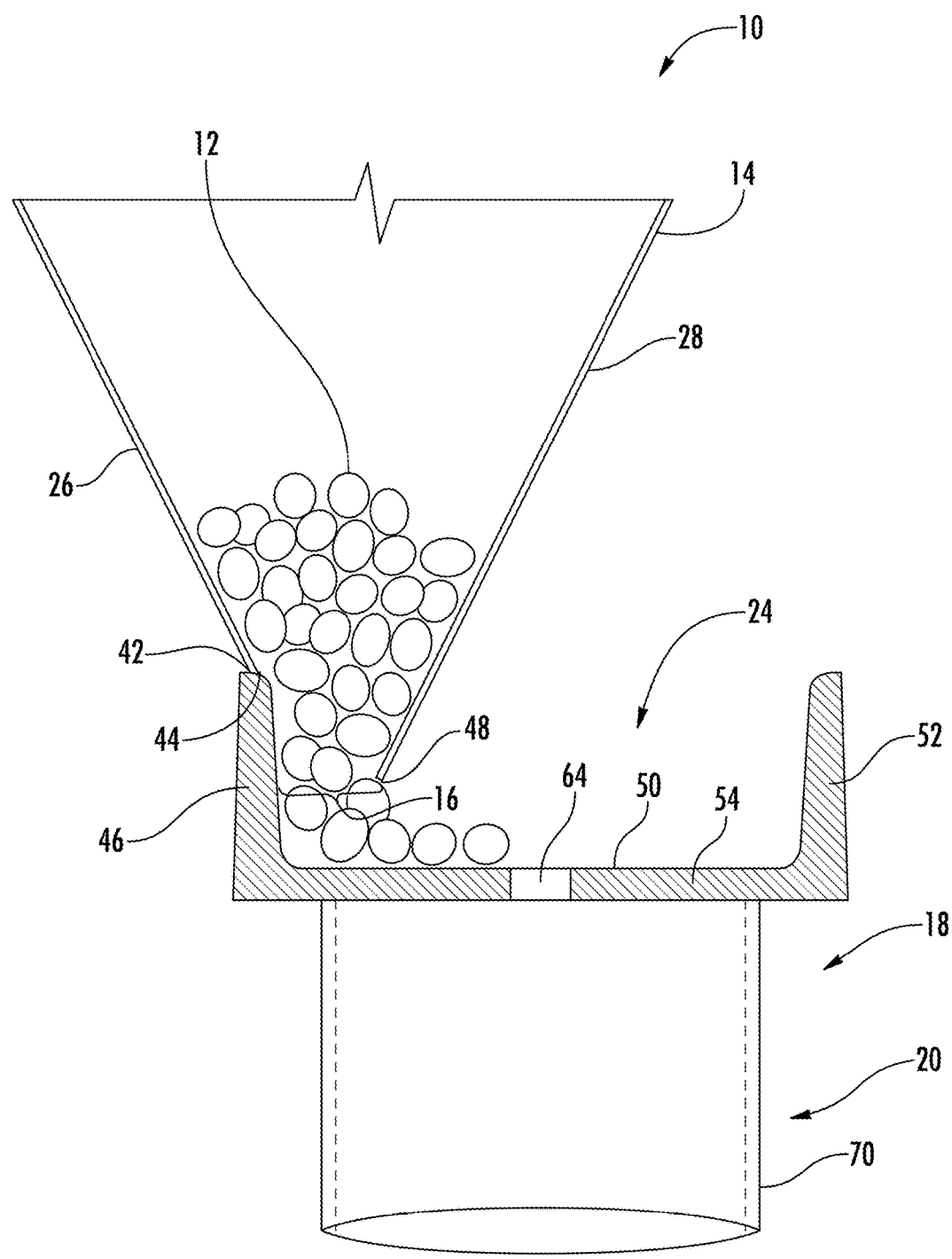
FIG. 3 is a partial, cross-sectional perspective view of the feed trough, taken at section line 3-3 in FIG. 2.
Figure 4:
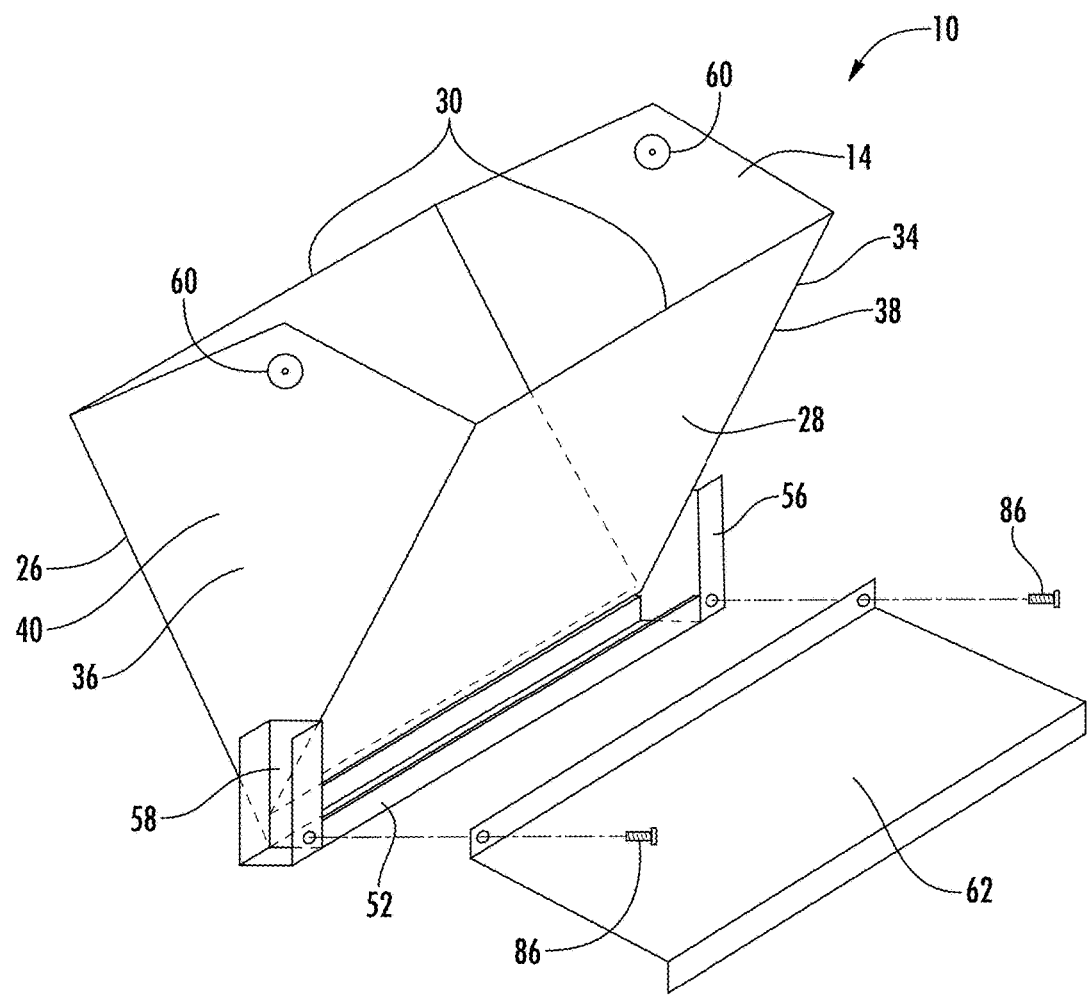
FIG. 4 is an exploded perspective view the animal feeder of FIG. 1 without the removable lid and including a varmint shield.
Figure 5:
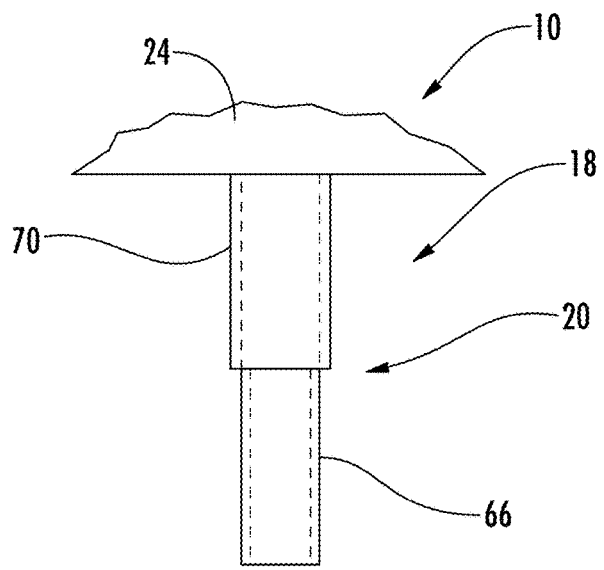
FIG. 5 is a front view of the support system for the animal feeder.
Figure 6:
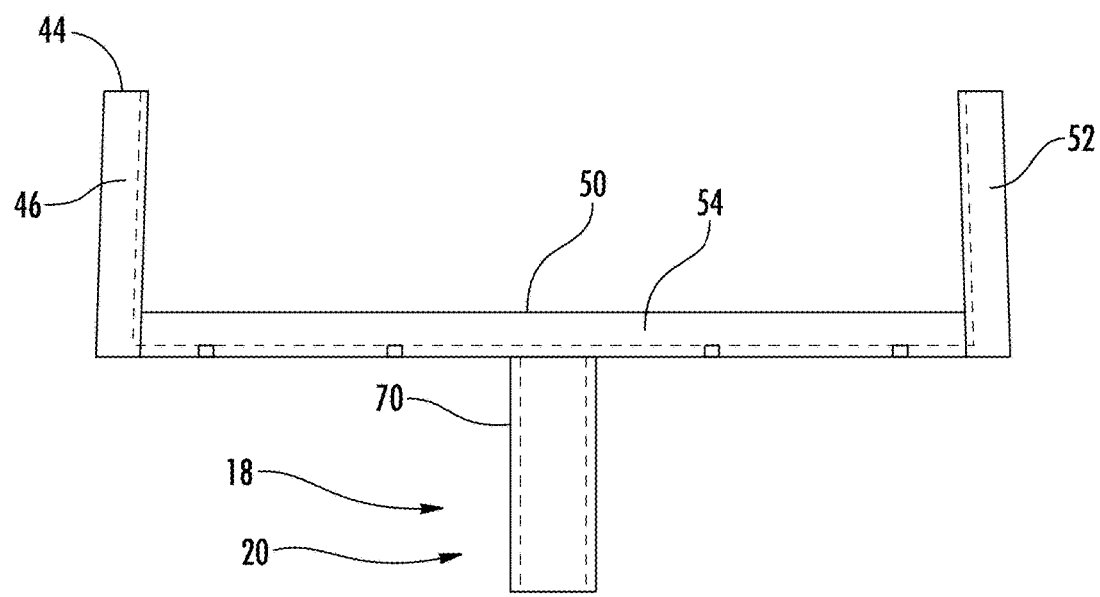
FIG. 6 is an end view of a feed trough of the animal feeder.
Figure 7:
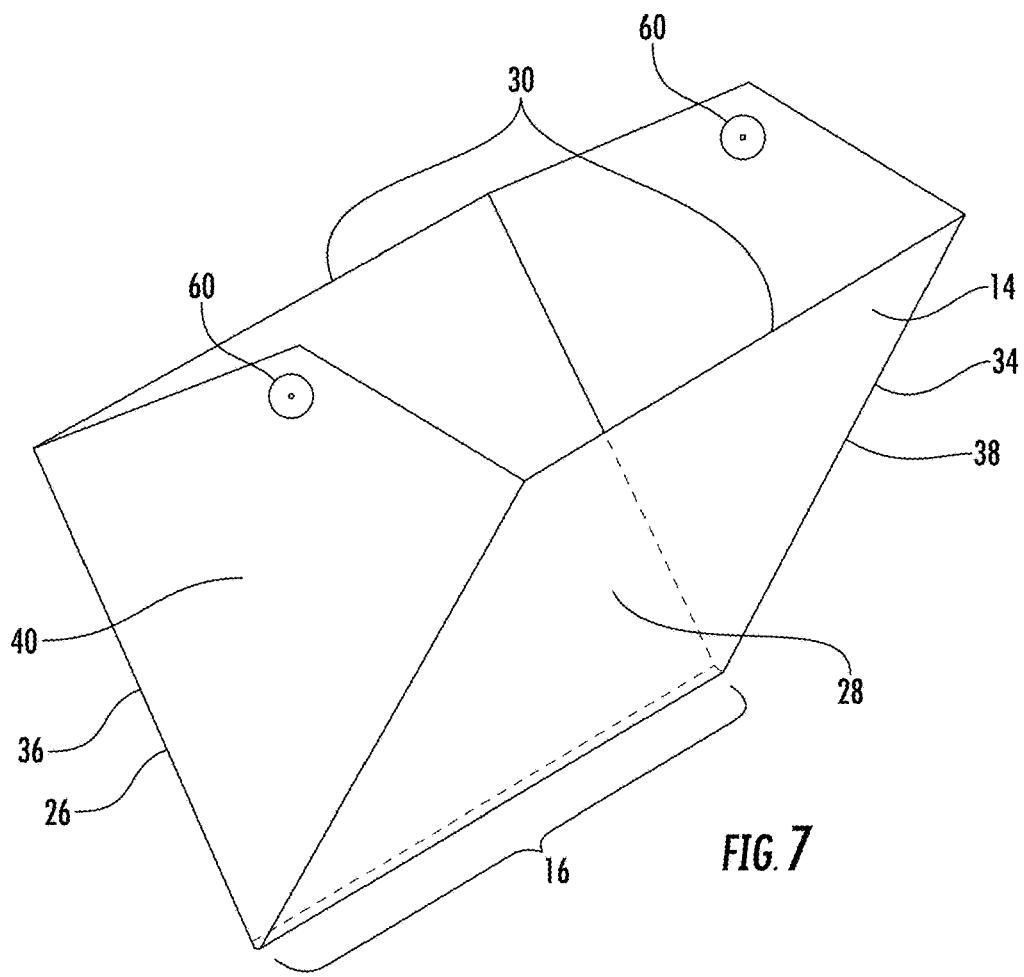
FIG. 7 is a perspective view the animal feeder of FIG. 1 without the removable lid.

As shown in FIG. 3, the animal feeder 10 may be configured such that the first sidewall 26 includes a first downward edge 42 that contacts an upper edge 44 of a rear wall 46 of the feed trough 24 at a level that is higher than a downward edge 48 of the second sidewall 28, thus causing the second sidewall 28 to extend lower than the first sidewall 26 yet positioning the downward edge 48 of the second sidewall 28 above an upper surface 50 of the feed trough 24. In at least one embodiment, the feed trough 24 may include a rear wall 46 and a front wall 52 that are supported by a support wall 54 having the upper surface 50. The feed trough 24 may be formed by, but is not limited to being form from a length of C channel material, such as but not limited to aluminum.

The animal feeder 10 may include one or more vents 60 for enabling air and moisture to be exhausted from the feed container 14. A vent 60 may be positioned in the first endwall 38 forming a portion of the feed container 14 and extending between the first and second sidewalls 26, 28 of the feed container 14. A vent may alternatively or in addition be positioned in the second endwall 40 forming a portion of the feed container 14 and extending between the first and second sidewalls 26, 28 of the feed container 14. The vent 60 may have any appropriate configuration and may be configured to allow gases, such as air and water vapor, to escape while preventing rain from entering the feed container 14. Such ventilation limits the growth of mold, thereby reducing the need for extensive cleaning of the feed container 14.

The animal feeder 10 may include a varmint shield 62 extending from the feed trough 24. The varmint shield 62 may be nonparallel and nonorthogonal with the ground. The varmint shield 62 may extend downward from the feed trough 24 to prevent animals from jumping from the ground and hanging onto the front wall 52 of the feed trough 24. In at least one embodiment, the varmint shield 62 may extend the full length of the first outlet opening 16. The varmint shield 62 may be attached in any appropriate manner such as, but not limited to, connectors 86, welds and the like.

Figure 8:
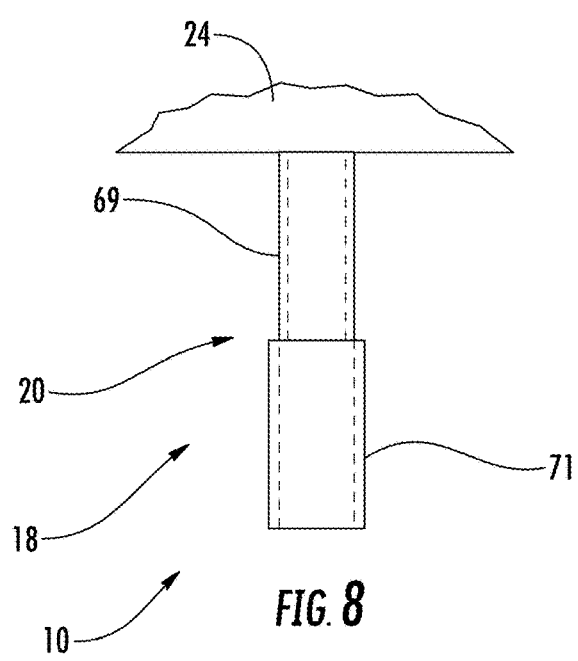
FIG. 8 is a front view of and alternative embodiment of the support system for the animal feeder.

As shown in FIGS. 1-3, 5 and 6, the support system 18 may include one or more receivers 70 extending downwardly from the feed trough 24. The receiver 70 may be configured to be rotatably attached to an upper end 68 of the post 66. In at least one embodiment, the receiver 70 may be much smaller in length than the post 66. The post 66 may extend into the receiver 70. The post 66 and receiver 70 may be formed from materials capable of supporting hundreds of pounds, and in some embodiments, a thousand pounds of feed. As such, the support system 18, including the post 66 and receiver 70, may be formed from metals, such as, but not limited to, galvanized steel, stainless steel, aluminum and iron. In another embodiment of the support system 18, as shown in FIG. 8, the support system 18 may be formed from one or more inserts 69 extending downwardly from the feed trough 24 and received within a hollow post that acts as receiver 71.

As shown in FIG. 1, the removable lid 32 may be formed from first and second sloped surfaces 72, 74 that are individually sloped and coupled to each other. The removable lid 32 may be coupled to the feed container 14 with removable connectors 76. The first and second sloped surfaces 72, 74 may be sized to extend beyond the first and second sidewalls 26, 28 and the first and second endwalls 38, 40 to provide protection to the feed trough 24 from rain. The removable connectors 76 may include, but are not limited to, screws, bolts, nuts and wing nuts. In at least one embodiment, a bolt 78 may be attached to a first bracket 80 welded to the first sidewall 26, and a wing nut 82 may be used to releasably secure the removable lid 32 to the first bracket 80. Similarly, a bolt 78 may be attached to a second bracket 84 welded to the second sidewall 28, and a wing nut 82 may be used to releasably secure the removable lid 32 to the second bracket 84.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. An animal feeder, comprising:
   a feed container formed from first and second sidewalls positioned nonparallel and nonorthogonal relative to each other to contain feed, wherein the first and second sidewalls create at least a portion of a first outlet opening positioned beneath a first inlet opening;
   a removable lid removably coupled to the feed container that is configured to prevent rain from entering the feed container;
   a feed trough positioned at the first outlet opening and configured to capture feed from the feed container without having the feed free flow from the feed container without external agitation of the feed, wherein the feed trough is formed by a support wall with a rear wall and a front wall extending generally upwardly to contain feed;
   a support system including at least one pivot for supporting the feed container above ground level and enabling the feed container to rotate relative to at least one support, thereby preventing smaller species animals from feeding in the feed trough in favor of larger species animals;
   wherein the first sidewall includes a first downward edge that contacts an upper edge of the rear wall of the feed trough at a level that is higher than a downward edge of the second sidewall, thus causing the second sidewall to extend lower than the first sidewall yet positioning the downward edge of the second sidewall above an upper surface of the feed trough; and
   wherein the first sidewall contacting the rear wall of the feed trough positions the first outlet opening offset from a center axis of the feed trough, thereby positioning the first outlet opening closer to the rear wall than the front wall.

2. The animal feeder of claim 1, wherein the first outlet opening extends from a first end of the feed container to a second end of the feed container preventing feed from becoming trapped within the feed container and spoiling.

3. The animal feeder of claim 2, wherein the first outlet opening extends from a first endwall forming a portion of feed container to a second endwall forming a portion of the feed container.

4. The animal feeder of claim 1, further comprising at least one vent for enabling air and moisture to be exhausted from the feed container.

5. The animal feeder of claim 4, wherein the at least one vent is positioned in a first endwall forming a portion of the feed container extending between the first and second sidewalls of the feed container.

6. The animal feeder of claim 1, wherein the feed trough is formed from a C channel.

7. The animal feeder of claim 6, wherein a first endwall extends between the first and second sidewalls at a first end and a second endwall extends between the first and second sidewalls at a second end on an opposite side from the first end, wherein a first end support attaches the first endwall to the feed trough and a second end support attaches the second endwall to the feed trough.

8. The animal feeder of claim 7, wherein the first and second end supports are C channels.

9. The animal feeder of claim 1, further comprising a linear varmint shield extending from the trough.

10. The animal feeder of claim 1, further comprising at least one drain hole positioned in the feed trough for draining liquids from the feed trough.

11. The animal feeder of claim 1, wherein the support system comprises at least one receiver extending downwardly from the feed trough, wherein the at least one receiver is configured to be rotatably attached to an upper end of at least one post.

12. The animal feeder of claim 11, wherein the at least one post extends into the at least one receiver.

13. The animal feeder of claim 1, wherein the removable lid is formed from first and second sloped surfaces that are individually sloped and coupled to each other.

14. The animal feeder of claim 1, wherein the removable lid is coupled to the feed container with removable connectors.

15. An animal feeder, comprising:
a feed container formed from first and second sidewalls positioned nonparallel and nonorthogonal relative to each other to contain feed, wherein the first and second sidewalls create at least a portion of a first outlet opening positioned beneath a first inlet opening;
a removable lid removably coupled to the feed container that is configured to prevent rain from entering the feed container;
a feed trough positioned at the first outlet opening and configured to capture feed from the feed container without having the feed free flow from the feed container without external agitation of the feed, wherein the feed trough is formed by a support wall with a rear wall and a front wall extending generally upwardly to contain feed;
wherein the first outlet opening extends from a first end of the feed container to a second end of the feed container preventing feed from becoming trapped within the feed container and spoiling;
wherein the first outlet opening extends from a first endwall forming a portion of feed container to a second endwall forming a portion of the feed container;
a support system including at least one pivot for supporting the feed container above ground level and enabling the feed container to rotate relative to at least one support, thereby preventing smaller species animals from feeding in the feed trough in favor of larger species animals; and
wherein the first sidewall includes a first downward edge that contacts an upper edge of the rear wall of the feed trough at a level that is higher than a downward edge of the second sidewall, thus causing the second sidewall to extend lower than the first sidewall yet positioning the downward edge of the second sidewall above an upper surface of the feed trough; and
wherein the first sidewall contacting the rear wall of the feed trough positions the first outlet opening offset from a center axis of the feed trough, thereby positioning the first outlet opening closer to the rear wall than the front wall.

16. The animal feeder of claim 15, further comprising at least one vent for enabling air and moisture to be exhausted from the feed container, wherein the at least one vent is positioned in the first endwall forming a portion of the feed container extending between the first and second sidewalls of the feed container.

17. The animal feeder of claim 15, wherein the support system comprises at least one receiver extending downwardly from the feed trough, wherein the at least one receiver is configured to be rotatably attached to an upper end of at least one post.

18. The animal feeder of claim 17, wherein the at least one post extends into the at least one receiver.

* * * * *